United States Patent
Hsu et al.

(10) Patent No.: US 10,281,759 B2
(45) Date of Patent: May 7, 2019

(54) TOUCH SENSING SUBSTRATE, AND STRUCTURE INTEGRATING POLARIZATION AND TOUCH FUNCTIONS

(71) Applicant: AU Optronics Corporation, Hsin-Chu (TW)

(72) Inventors: Chia-Chun Hsu, Hsin-Chu (TW); Yen-Hua Lo, Hsin-Chu (TW); Ju-Chin Chen, Hsin-Chu (TW); Syuan-Ling Yang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/817,430

(22) Filed: Nov. 20, 2017

(65) Prior Publication Data

US 2018/0356665 A1    Dec. 13, 2018

(30) Foreign Application Priority Data

Jun. 12, 2017  (TW) .............................. 106119402 A

(51) Int. Cl.
*G06F 3/041* (2006.01)
*G02F 1/1333* (2006.01)
(Continued)

(52) U.S. Cl.
CPC ........ *G02F 1/13338* (2013.01); *G02F 1/1343* (2013.01); *G02F 1/133514* (2013.01);
(Continued)

(58) Field of Classification Search
CPC combination set(s) only.
See application file for complete search history.

(56) References Cited

U.S. PATENT DOCUMENTS

| 9,740,344 B2 * | 8/2017 | Huang .................... G06F 3/044 |
| 2009/0002337 A1 * | 1/2009 | Chang .................... G06F 3/044 |
| | | 345/174 |

(Continued)

FOREIGN PATENT DOCUMENTS

| CN | 101349960 A | 1/2009 |
| CN | 101501618 A | 8/2009 |

(Continued)

OTHER PUBLICATIONS

Taiwan Intellectual Property Office, "Office Action" dated Oct. 25, 2017, Taiwan.

*Primary Examiner* — Pegeman Karimi
(74) *Attorney, Agent, or Firm* — WPAT, PC

(57) ABSTRACT

A structure integrating polarization and touch functions includes first touch electrodes and second touch electrodes. A first touch electrode includes a first connecting line and a plurality of first conducting lines. End points of the first conducting lines are disposed along an outline of an M-sided polygon (M≥3). For the first touch electrode, the first connecting line electrically connects the first conducting lines. A second touch electrode includes a plurality of second conducting lines and a second connecting line. End points of the second conducting lines are disposed along an outline of an N-sided polygon (N≥3). For a second touch electrode, the second connecting line electrically connects the second conducting lines. Widths of the first and second conducting lines range from approximately 50 to 100 nanometers.

22 Claims, 10 Drawing Sheets

(51) Int. Cl.
*G02F 1/1335* (2006.01)
*G02F 1/1343* (2006.01)
*G06F 3/047* (2006.01)
*G06F 3/044* (2006.01)

(52) U.S. Cl.
CPC .............. *G06F 3/044* (2013.01); *G06F 3/047* (2013.01); *G06F 3/0412* (2013.01); *G02F 2001/133548* (2013.01); *G06F 2203/04111* (2013.01)

(56) References Cited

U.S. PATENT DOCUMENTS

| | | | |
|---|---|---|---|
| 2012/0262409 A1* | 10/2012 | Tsai | G06F 3/044 345/174 |
| 2013/0127771 A1 | 5/2013 | Carley et al. | |
| 2015/0109248 A1* | 4/2015 | Tokai | G06F 3/044 345/174 |
| 2016/0147113 A1 | 5/2016 | Chang et al. | |
| 2016/0195983 A1* | 7/2016 | Miyake | G06F 3/0416 345/174 |
| 2016/0231844 A1 | 8/2016 | Lee et al. | |
| 2017/0090647 A1* | 3/2017 | Kim | G06F 3/044 |
| 2017/0220158 A1 | 8/2017 | Peng et al. | |
| 2018/0039360 A1* | 2/2018 | Akimoto | G06F 3/0412 |
| 2018/0188582 A1* | 7/2018 | Teng | G02F 1/13338 |
| 2018/0196558 A1* | 7/2018 | Wang | G06F 3/0412 |
| 2018/0329537 A1* | 11/2018 | Gunji | G06F 3/0412 |

FOREIGN PATENT DOCUMENTS

| | | |
|---|---|---|
| CN | 203178967 U | 9/2013 |
| CN | 103336382 A | 10/2013 |
| CN | 105425992 A | 3/2016 |
| CN | 105652504 A | 6/2016 |
| TW | 2013029833 A | 7/2013 |
| TW | 201439837 A | 10/2014 |
| TW | 201619769 A | 6/2016 |
| WO | WO2007146780 A2 | 12/2007 |

* cited by examiner

TOUCH SENSING SUBSTRATE, AND STRUCTURE INTEGRATING POLARIZATION AND TOUCH FUNCTIONS

BACKGROUND

Technical Field

The present invention relates to a touch sensing substrate and a touch structure, and in particular, to a structure integrating polarization and touch functions.

Related Art

A touch screen is a component having display and Input/Output (I/O) functions possessed by many mobile devices such as smartphones and tablet computers, and the foregoing mobile devices usually have small thicknesses, so as to be portable. To manufacture a mobile device with a small thickness, current touch screens already have a thinning tendency.

A common touch screen includes a display panel and a touch sensing substrate. The display panel and the touch sensing substrate are usually adhered to each other by using an optical clear adhesive (OCA). Before the display panel and the touch sensing substrate are adhered to each other, a precise aligning process needs to be performed to avoid misalignment between the display panel and the touch sensing substrate. In addition, in an adhering process, it is also needed to pay attention to whether the OCA is evenly coated. Otherwise, occurrence of an air bubble may be caused between the display panel and the touch sensing substrate.

A common OCA has strong viscosity, and existing display panels and touch sensing substrates are all thin. Therefore, once the foregoing misalignment or air bubble occurs, it is difficult to directly separate the display panel and the touch sensing substrate, which are adhered to each other, without destroying the display panel and the touch sensing substrate. Therefore, a touch screen having a misalignment or air bubble defect needs to be repaired by performing a complex rework process. In a severe case, it is likely that such a defective touch screen cannot be repair and is forced to be scrapped.

SUMMARY

At least one embodiment of the present invention provides a structure integrating polarization and touch functions, which is applicable to a touch screen and can satisfy an existing thinning tendency.

At least one embodiment of the present invention provides a touch sensing substrate, including the foregoing structure integrating polarization and touch functions.

The structure integrating polarization and touch functions provided by the at least one embodiment of the present invention includes a plurality of first touch electrodes and a plurality of second touch electrodes, where the second touch electrodes are not in contact with the first touch electrodes. One of the first touch electrodes includes a first connecting line and a plurality of first conducting lines parallel to each other amd arranged along a first direction, where end points of the first conducting lines are substantially disposed along an outline of an M-sided polygon, M is a positive integer greater than or equal to 3, and the first connecting line electrically connects the first conducting lines. One of the second touch electrodes includes a second connecting line and a plurality of second conducting lines parallel to each other and arranged along the first direction, where end points of the second conducting lines are substantially disposed along an outline of an N-sided polygon, N is a positive integer greater than or equal to 3, and the second connecting line electrically connects the second conducting lines, where widths of each of the first conducting lines and each of the second conducting lines range from approximately 50 to 100 nanometers.

In an embodiment of the present invention, the foregoing structure further includes a plurality of bridging lines, where each of the bridging lines electrically connects two adjacent ones of the first touch electrodes arranged along the first direction to form a plurality of first touch sensing strips arranged along a second direction, and the second direction is different from the first direction. Two Adjacent ones of the second touch electrodes arranged along the second direction are electrically connected to each other to form a plurality of second touch sensing strips arranged along the first direction.

In an embodiment of the present invention, the second direction is perpendicular to the first direction.

In an embodiment of the present invention, the foregoing structure further includes a plurality of joining lines, where each of the joining lines electrically connects two adjacent ones of the second touch electrodes arranged along the second direction to form the second touch sensing strips, and each of the joining lines electrically connects two adjacent ones of the second conducting lines.

In an embodiment of the present invention, in a same first touch electrode, the first connecting line connects all of the end points of the first conducting lines and forms the M-sided polygon.

In an embodiment of the present invention, an end point of each of the first conducting lines of the one of the first touch electrodes is connected to the first connecting line, and the other end point of each of the first conducting lines of the one of the first touch electrodes is not connected to the first connecting line of the one of the first touch electrodes.

In an embodiment of the present invention, the first connecting line of the one of the first touch electrodes includes a first line segment and a plurality of second line segments. The first line segment extends along the first direction and is not connected to the end points of the first conducting lines. The first line segment is located between the second line segments, and each of the second line segments extends along a third direction. One of the second line segments is connected to end points of some of the first conducting lines, and another one of the second line segments is connected to end points of some others of the first conducting lines.

In an embodiment of the present invention, an included angle between the third direction and the first direction is approximately greater than 0 degree and less than 90 degrees.

In an embodiment of the present invention, two end points of the first line segment are respectively directly connected to end points of one of the second line segments and end point of another one of the second line segments.

In an embodiment of the present invention, a sum of a total number of the first conducting lines and a total number of the second conducting lines is a conducting line sum, and a sum of a total number of the first connecting lines and a total number of the second connecting lines is a connecting line sum, where a ratio of the connecting line sum to the conducting line sum is approximately greater than 0 and less than or equal to 0.5.

In an embodiment of the present invention, the first touch electrodes and the second touch electrodes are coplanar.

In an embodiment of the present invention, the first touch electrodes and the second touch electrodes are non-coplanar.

In an embodiment of the present invention, the foregoing structure further includes a mesh wire grid, formed on a mesh area between the first touch electrodes and the second touch electrodes. The mesh wire grid includes a plurality of third conducting lines that are parallel to each other, where the third conducting lines are arranged along the first direction, and are not connected to the first touch electrodes and the second touch electrodes, and a width of each of the third conducting lines is approximately 50 to 100 nanometers.

The touch sensing substrate provided by one of the embodiment of the present invention includes a substrate, a color filter array, the plurality of first touch electrodes, and the plurality of second touch electrodes. The substrate has a first surface, and the color filter array includes a plurality of color filter layers, formed on the first surface. The first touch electrodes and the second touch electrodes are all disposed on the first surface.

In an embodiment of the present invention, the color filter layers substantially cover the first touch electrodes and the second touch electrodes.

In an embodiment of the present invention, the first touch electrodes and the second touch electrodes substantially cover the color filter layers.

In an embodiment of the present invention, the color filter layers are located between the first touch electrodes and the second touch electrodes.

In an embodiment of the present invention, the foregoing touch sensing substrate further includes the plurality of bridging lines.

In an embodiment of the present invention, the color filter layers are located between the first touch electrodes and the bridging lines.

In an embodiment of the present invention, all of the bridging lines, the first touch electrodes, and the second touch electrodes are located between the color filter layers and the first surface.

In an embodiment of the present invention, the foregoing touch sensing substrate further includes an active component array, where the color filter array is located between the active component array and the first surface.

In an embodiment of the present invention, the foregoing touch sensing substrate further includes an active component array, where the active component array is located between the color filter array and the first surface. The active component array is located between the first touch electrodes and the substrate, and the active component array is located between the second touch electrodes and the substrate.

In an embodiment of the present invention, the active component array and the color filter array are both located between the first touch electrodes and the second touch electrodes.

In an embodiment of the present invention, the color filter array further includes a black matrix, located between the color filter layers and the substrate.

In an embodiment of the present invention, the first conducting lines and second conducting lines whose widths range from 50 to 100 nanometers are formed so that the first touch electrodes and the second touch electrodes not only can be applied to touch sensing, but also have a linear polarization function. In this way, the touch sensing substrate of the present invention may directly constitute at least one part of a display. For example, the touch sensing substrate may be directly used as a color filter array substrate and a polarizer in a liquid crystal display (LCD), and may be further used for manufacturing an in-cell touch screen.

To make the foregoing and other objectives, features, and advantages of the present invention comprehensible, embodiments accompanied with drawings are described below in detail.

DETAILED DESCRIPTION

Figure 1A:
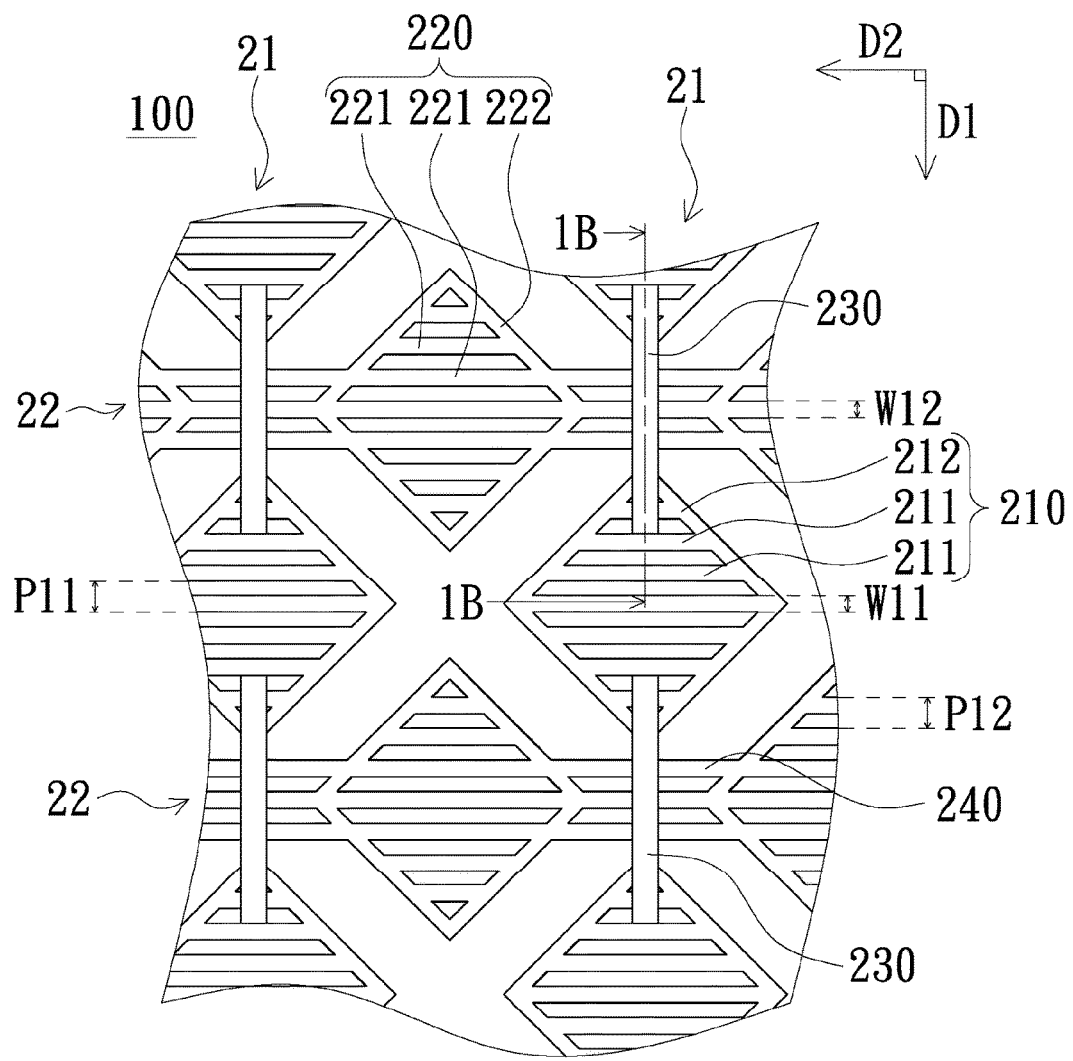
FIG. 1A is a top view of a touch sensing substrate according to an embodiment of the present invention.
Figure 1B:
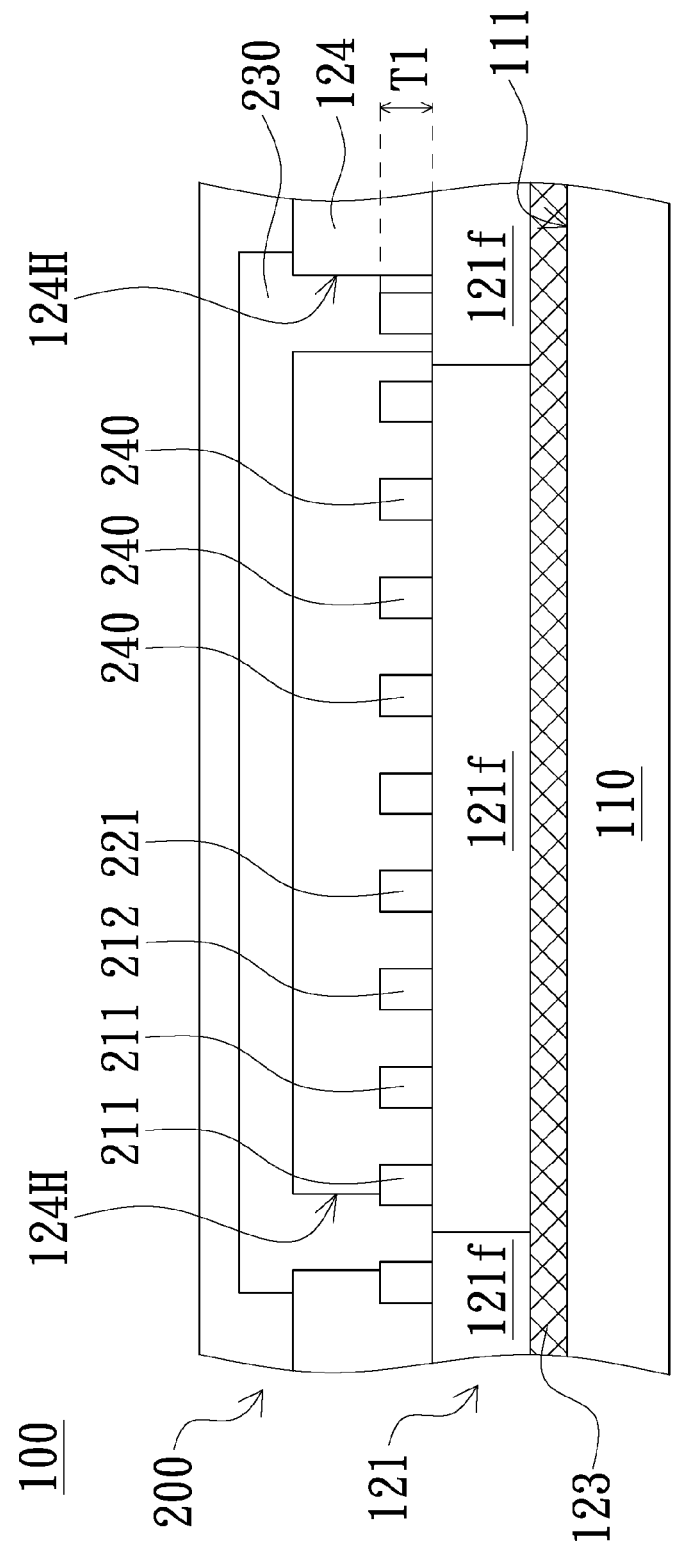
FIG. 1B is a sectional view of a section along line 1B-1B in FIG. 1A.

FIG. 1A is a top view of a touch sensing substrate according to an embodiment of the present invention, and FIG. 1B is a sectional view of a section along line 1B-1B in FIG. 1A. Referring to FIG. 1A and FIG. 1B, a touch sensing substrate 100 includes a substrate 110 and a structure 200 integrating polarization and touch functions. The structure 200 integrating polarization and touch functions is formed on the substrate 110, and the substrate 110 is transparent. For example, the substrate 110 may be a glass plate or an acrylic plate.

The substrate 110 has a first surface 111, which, for example, is a plane, and the structure 200 integrating polarization and touch functions is formed on the first surface 111. The structure 200 integrating polarization and touch functions includes a plurality of first touch electrodes 210 and a plurality of second touch electrodes 220. The first touch electrodes 210 and the second touch electrodes 220 are all formed on the first surface 111, and the first touch electrodes 210 and the second touch electrodes 220 are coplanar. The first touch electrodes 210 and the second touch electrodes 220 are used for touch sensing. The second touch electrodes 220 are not in contact with the first touch electrodes 210, so that a current transferred in the second touch electrodes 220 would not be directly transferred into the first touch electrodes 210. The first touch electrodes 210 and the second touch electrodes 220 may be used as sensing electrodes (Rx) and driving electrodes (Tx) for transferring and receiving a touch signal. For example, the first touch electrodes 210 may be sensing electrodes, and the second touch electrodes 220 may be driving electrodes. On the contrary, the first touch electrodes 210 may be driving electrodes, and the second touch electrodes 220 may be sensing electrodes.

Each first touch electrode 210 and each second touch electrode 220 both include a plurality of conducting lines that are parallel to each other. One of the first touch electrodes 210 includes a plurality of first conducting lines 211 that are parallel to each other, and one of the second touch electrodes 220 includes a plurality of second conducting lines 221 that are parallel to each other. The first conducting lines 211 and the second conducting lines 221 are all arranged along a first direction D1. That is, the first conducting lines 211 and the second conducting lines 221 are all parallel to each other. As shown in FIG. 1A, the first conducting lines 211 and the second conducting lines 221 are substantially arranged in parallel.

The first conducting lines 211 and the second conducting lines 221 may be manufactured by means of nanoimprinting, and the first conducting lines 211 and the second conducting lines 221 may be made from metal or carbon nanotubes. A width W11 of each of the first conducting lines 211 and a width W12 of each of the second conducting lines 221 range from approximately 50 to 100 nanometers, and a pitch P11 between the first conducting lines 211 is equal to a pitch P12 between the second conducting lines 221, and they range from approximately 50 to 100 nanometers. In addition, the first conducting lines 211 and the second conducting lines 221 all have a same thickness T1, which ranges from approximately 50 to 750 nanometers. It can be learned from the above that the first conducting lines 211 and the second conducting lines 221 are all subwavelength structures. Therefore, the first conducting lines 211 and the second conducting lines 221 can only diffuse light rays (particularly, visible light) and cannot diffract light rays. In other words, the first touch electrodes 210 and the second touch electrodes 220 would not generate a diffraction spot or a diffraction stripe that destroys a picture.

Because the first conducting lines 211 and the second conducting lines 221 are all parallel to each other, the structure 200 integrating polarization and touch functions forms a wire grid polarizer (WGP), so as to have a linear polarization function. In addition, in this embodiment, the width W11 of the first conducting line 211 is equal to the width W12 of the second conducting line 221. However, in another embodiment, the width W11 of the first conducting line 211 does not need to be equal to the width W12 of the second conducting line 221.

In a same first touch electrode 210, the first conducting lines 211 are electrically connected to each other. Likewise, in a same second touch electrode 220, the second conducting lines 221 are electrically connected to each other. One of the first touch electrodes 210 further includes a first connecting line 212, which electrically connects the first conducting lines 211 in the same first touch electrode 210. One of the second touch electrodes 220 further includes a second connecting line 222, which electrically connects the second conducting lines 211 in the same second touch electrode 220. In this way, all of the first conducting lines 211 in the same first touch electrode 210 are electrically connected to each other, and all of the second conducting lines 221 in the same second touch electrode 220 are electrically connected to each other. In addition, a width of the first connecting line 212 may be equal to the width W11, and a width of the second connecting line 222 may be equal to the width W12. Both of the first connecting line 212 and the second connecting line 222 also have a same thickness T1, and materials and manufacturing methods of the first connecting line 212 and the second connecting line 222 may be the same as those of the first conducting lines 211 and the second conducting lines 221.

Figure 1C:
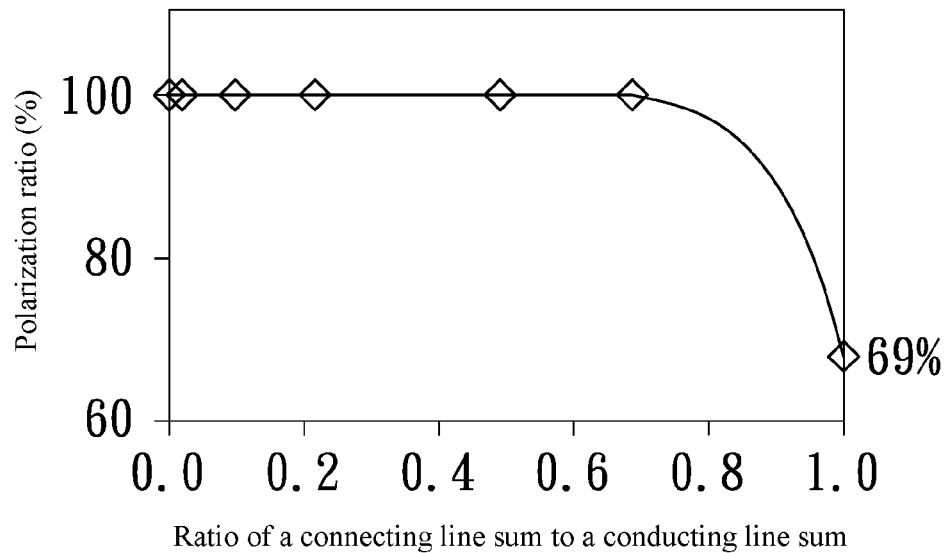
FIG. 1C is a line graph of simulating that a polarization ratio changes as a ratio of a connecting line sum to a conducting line sum differs.
Figure 1D:
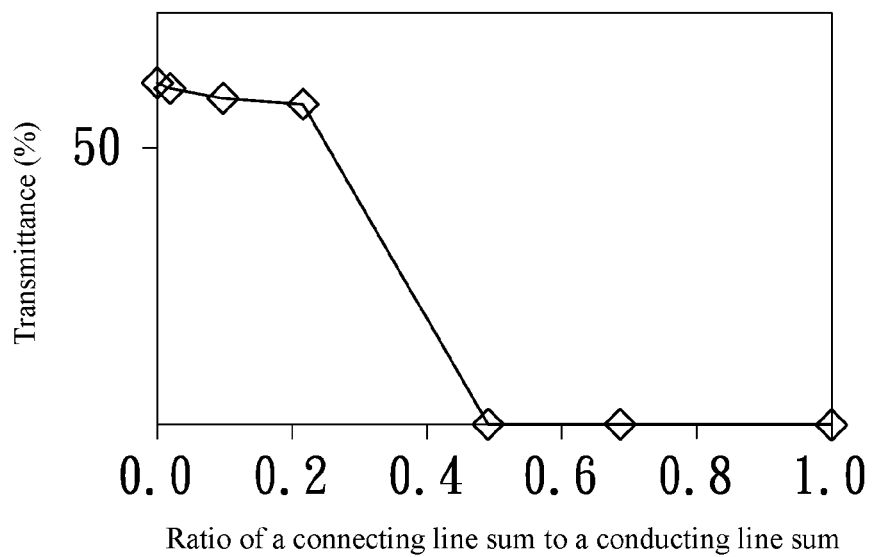
FIG. 1D is a line graph of simulating that transmittance changes as a ratio of a connecting line sum to a conducting line sum differs.

A sum of a total number of the first conducting lines 211 and a total number of the second conducting lines 221 is a conducting line sum, and a sum of a total number of the first connecting lines 212 and a total number of the second connecting lines 222 is a connecting line sum. In this embodiment, a ratio of the connecting line sum to the conducting line sum is approximately greater than 0 and less than or equal to 0.5. In addition, the foregoing ratio of the connecting line sum to the conducting line sum may affect a polarization ratio and transmittance, as shown in FIG. 1C and FIG. 1D. The polarization ratio herein is defined as shown in the following mathematical formula.

$$P=\sqrt{(W-D)/(W+D)} \times 100\%$$

P is a polarization ratio, W is light intensity of incident light passing through two polarization directions that are parallel to each other, and D is light intensity of incident light passing through two polarization directions that are perpendicular to each other.

FIG. 1C is a line graph of simulating that a polarization ratio changes as a ratio of a connecting line sum to a conducting line sum differs, and FIG. 1D is a line graph of simulating that transmittance changes as a ratio of a connecting line sum to a conducting line sum differs. FIG. 1C and FIG. 1D are drawn on the conditions that widths of all of the first conducting line 211, the second conducting line 221, the first connecting line 212, and the second connecting line 222 are the same (that is, the width W11 is equal to the width W12), and that the pitch P11 is equal to the pitch P12. Moreover, FIG. 1C and FIG. 1D are drawn according to the following table.

| Ratio of a connecting line sum to a conducting line sum | Polarization ratio (%) | Transmittance (%) |
|---|---|---|
| 0 | 99.99999967 | 57.2766 |
| 0.02 | 99.99999969 | 56.3856 |
| 0.1 | 99.99999973 | 54.5574 |
| 0.22 | 99.99999976 | 53.6216 |
| 0.49 | 99.99984354 | 0.0817 |
| 0.69 | 99.93531922 | 0.0001 |
| 1 | 68.57503715 | 0 |

First referring to FIG. 1C and the foregoing table, when the ratio of the connecting line sum to the conducting line sum is equal to 0.69, the structure 200 integrating polarization and touch functions still has a polarization ratio of nearly 100%. When the ratio of the connecting line sum to the conducting line sum is equal to 1, that is, the connecting line sum is equal to the conducting line sum, the structure 200 integrating polarization and touch functions still has a polarization ratio of approximately 69%. Referring to FIG. 1D, when the ratio of the connecting line sum to the conducting line sum is equal to 0.22, the structure 200 integrating polarization and touch functions still has transmittance greater than 50%. It could be learned from the above that when the ratio of the connecting line sum to the conducting line sum is lower than 0.22, the structure 200 integrating polarization and touch functions still has a good polarization ratio and good transmittance.

In addition, in this embodiment, shapes and structures of the first touch electrode 210 and the second touch electrode 220 may be the same. Outline shapes of the first touch electrode 210 and the second touch electrode 220 may be simple polygons (which may also be referred to as non-self-intersecting polygons), and in view of FIG. 1A, outline shapes of the first touch electrode 210 and the second touch electrode 220 are the same to each other.

Specifically, in a same first touch electrode 210, end points (not marked) of the first conducting lines 211 are disposed substantially along an outline of an M-sided polygon, and in a same second touch electrode 220, and end points (not marked) of the second conducting lines 221 are disposed substantially along an outline of N-sided polygon. Both M and N are positive integers greater than or equal to 3, and M and N do not need to be equal to each other, or may be equal to each other as shown in FIG. 1A, where M and N are both equal to 4, that is, the end points of the first conducting lines 211 and the end points of the second conducting lines 221 are all disposed along outlines of quadrilaterals.

In addition, in this embodiment, in the same first touch electrode 210, the first connecting line 212 connects all of the end points of the first conducting lines 211 and forms the M-sided polygon (that is, a quadrilateral) in a surrounding manner. Likewise, in the same second touch electrode 220, the second connecting line 222 connects all of the end points of the second conducting lines 221 and forms the N-sided polygon (that is, a quadrilateral) in a surrounding manner, as shown in FIG. 1A.

In another embodiment, both of M and N may approach infinity, so that outlines of the first touch electrode 210 and the second touch electrode 220 may be circular or elliptical. In other words, in the same first touch electrode 210, the end points of the first conducting lines 211 may be disposed substantially along a circular or elliptical outline. Similarly, in the same second touch electrode 220, the end points of the second conducting lines 221 may be disposed substantially along a circular or elliptical outline.

In addition, in the embodiments shown in FIG. 1A and FIG. 1B, the first touch electrodes 210 arranged on a same row are electrically connected to each other to form a plurality of longitudinally extending first touch sensing strips 21, and the second touch electrode 220 arranged on a same column are electrically connected to each other to form a plurality of transversely extending second touch sensing strips 22. The structure 200 integrating polarization and touch functions further includes a plurality of bridging lines 230, where each of the bridging lines 230 connects adjacent two of the first touch electrodes 210, so as to electrically connect the adjacent two of the first touch electrodes 210 arranged along the first direction D1 to form the first touch sensing strips 21 arranged along a second direction D2.

The touch sensing substrate 100 may further include a planarization layer 124, whose material may be a polymer material. The planarization layer 124 is formed on the first surface 111 and covers the first touch electrodes 210 and the second touch electrodes 220. That is, the planarization layer 124 covers the first conducting lines 211, the second conducting lines 221, the first connecting lines 212, and the second connecting lines 222. In addition, in this embodiment, the planarization layer 124 is provided with a plurality of contact holes 124H, and each of the contact holes 124H exposes a part of at least one first conducting line 211. The bridging lines 230 are formed on the planarization layer 124 and extend into the contact holes 124H to connect the first conducting lines 211. In this way, the bridging lines 230 electrically connect two adjacent ones of the first touch electrodes 210.

The structure 200 integrating polarization and touch functions further includes a plurality of joining lines 240. Each joining line 240 electrically connect two adjacent ones of the second touch electrodes 220 arranged along the second direction D2 to form the second touch sensing strips 22, and each joining line 240 electrically connect two adjacent ones of the second conducting lines 221 arranged along the second direction D2. In a second touch sensing strip 22 shown in FIG. 1A and FIG. 1B, for example, three joining line 240 are formed between two adjacent ones of the second touch electrodes 220, each of the joining lines 240 substantially extends from an end of one of the second conducting lines 221 to an end of another second conducting line 221. In this way, the second touch electrodes 220 of the same second touch sensing strip 22 may be electrically connected to each other. The material of the joining lines 240 may be the same as that of the second conducting lines 221, and the joining lines 240 and the second touch electrodes 220 may be formed by means of a same process (for example, nanoimprinting). Besides, the second direction D2 is different from the first direction D1. Using FIG. 1A as an example, the second direction D2 may be perpendicular to the first direction D1.

The touch sensing substrate 100 may be applied to a display and may constitute at least one part of the display. For example, in this embodiment, the touch sensing substrate 100 may be a color filter array substrate used in a liquid crystal display panel (LCD panel), so that the touch sensing substrate 100 includes a color filter array 120, including a plurality of color filter layers 121f and formed on the first surface 111. The color filter layers 121f have multiple colors such as red, blue, and green. In this way, when passing through the touch sensing substrate 100, light rays may form light of multiple colors, such as red light, green light, and blue light, to generate a color picture on a screen of the display (for example, an LCD).

In this embodiment, the first touch electrodes 210 and the second touch electrodes 220 substantially cover the color filter layers 121f, and the color filter layers 121f are located between the first touch electrodes 210 and the bridging lines 230. The planarization layer 124 further covers the color filter layers 121f, as shown in FIG. 1B. In addition, the color filter array 121 in this embodiment may further include a black matrix 123, located between the color filter layers 121f and the substrate 110. However, in another embodiment, the color filter array 121 does not need to include the black matrix 123 and the color filter layers 121f. For example, when the touch sensing substrate 100 is applied to a color sequential LCD, the touch sensing substrate 100 does not need to include the color filter array 121, and the structure 200 integrating polarization and touch functions may be formed on the first surface 111. Therefore, the color filter layer 121 and the black matrix 123 shown in FIG. 1B are merely used as examples for description instead of limiting the present invention.

Figure 2:
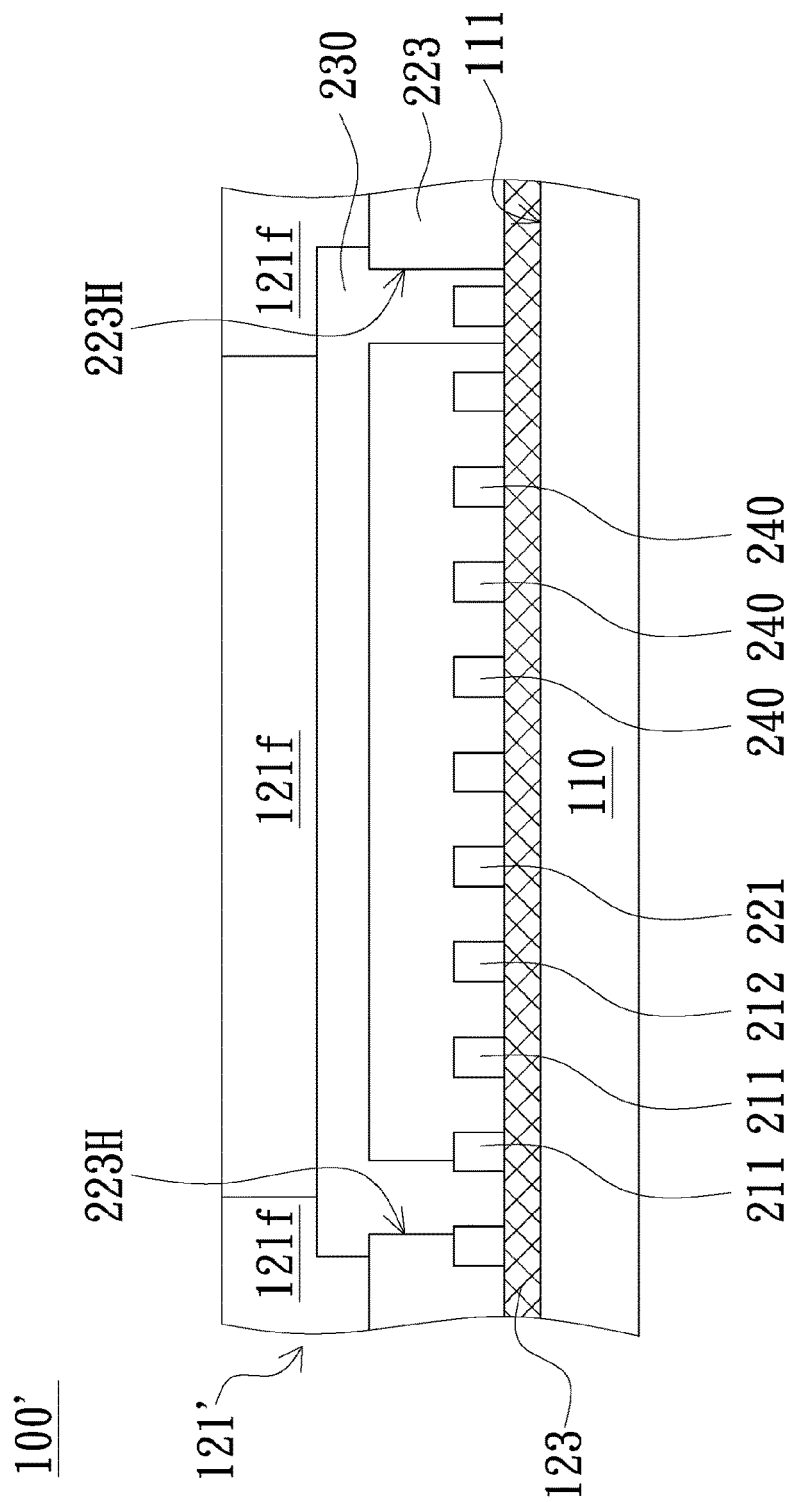
FIG. 2 is a sectional view of a touch sensing substrate according to another embodiment of the present invention.

FIG. 2 is a sectional view of a touch sensing substrate according to another embodiment of the present invention. Referring to FIG. 2, a touch sensing substrate 100' shown in FIG. 2 is similar to the touch sensing substrate 100. For example, both of the touch sensing substrates 100' and 100 have the same layouts of the first touch electrodes 210 and the second touch electrodes 220. Moreover, the touch sensing substrate 100' may also include a planarization layer 223, and a material thereof may be the same as that of the planarization layer 124. The planarization layer 223 is also provided with a plurality of contact holes 223H, and the bridging lines 230 formed on the planarization layer 223 may connect the first conducting lines 211 through the contact hole 223H, so as to electrically connect two adjacent ones of the first touch electrodes 210. However, a difference still exists between the touch sensing substrates 100' and 100: a filter array 121' included in the touch sensing substrate 100'. In the filter array 121', the bridging lines 230, the first touch electrodes 210, and the second touch electrodes 220 are all located between the color filter layers 121*f* and the first surfaces 111, and the color filter layers 121*f* substantially cover the first touch electrodes 210 and the second touch electrodes 220, as shown in FIG. 2.

Figure 3A:
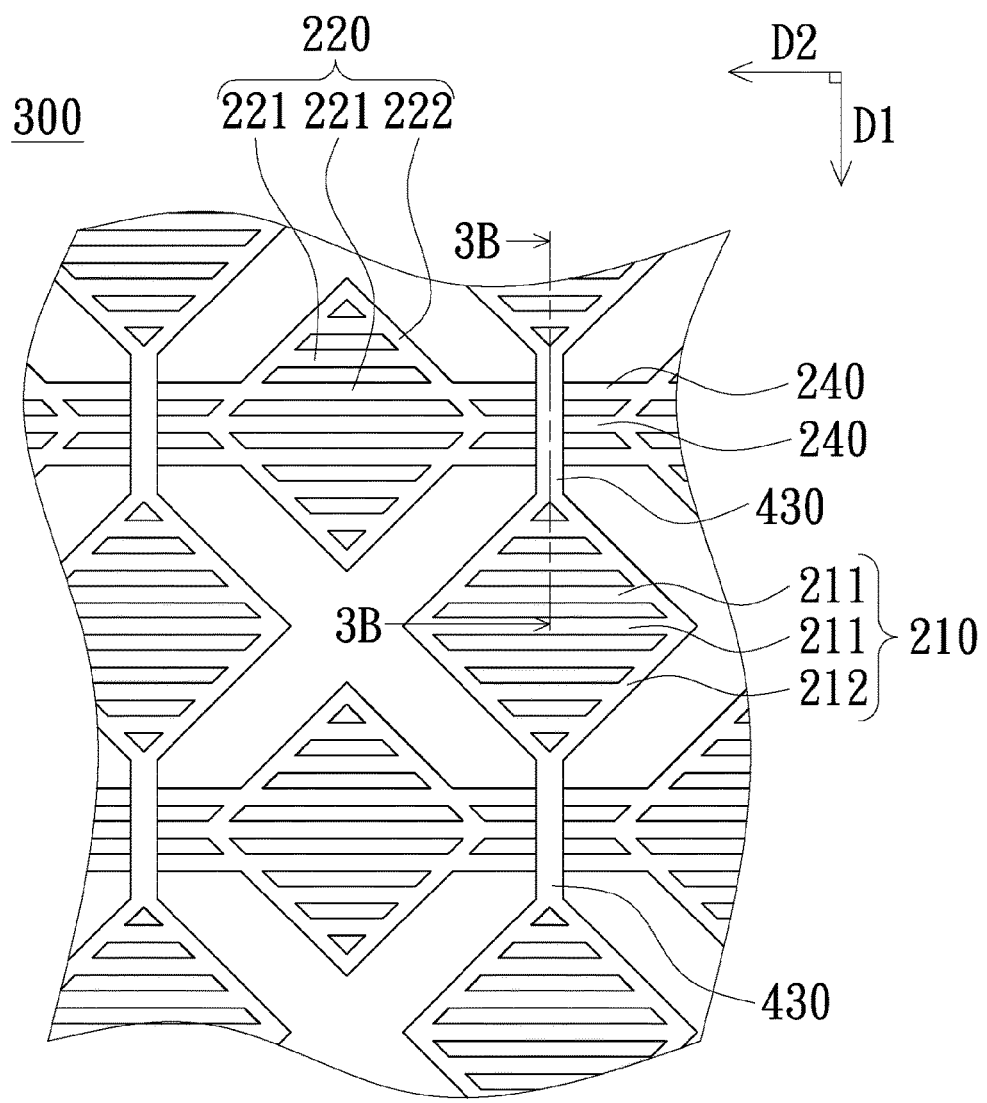
FIG. 3A is a top view of a touch sensing substrate according to an embodiment of the present invention.
Figure 3B:
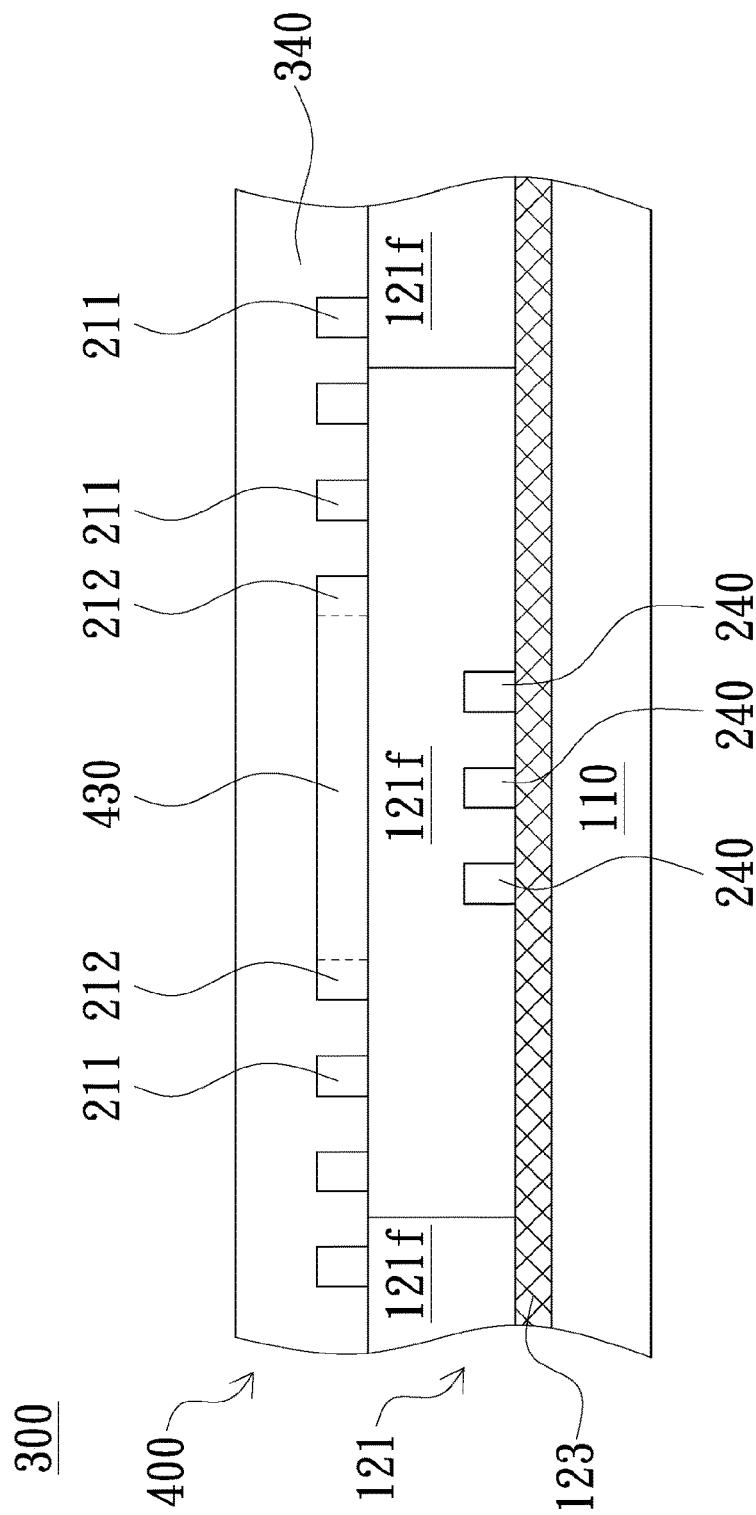
FIG. 3B is a sectional view of a section along line 3B-3B in FIG. 3A.

FIG. 3A is a top view of a touch sensing substrate according to an embodiment of the present invention, and FIG. 3B is a sectional view of a section along line 3B-3B in FIG. 3A. Referring to FIG. 3A and FIG. 3B, a touch sensing substrate 300 in this embodiment is similar to those in the foregoing embodiments, and functions and advantages of the touch sensing substrate 300 are also the same as those of the touch sensing substrates 100 and 100'. Therefore, differences between the embodiments are mainly described below, and details of the same technical features are not described below again.

Different from the foregoing embodiments, in a structure 400 integrating polarization and touch functions of FIG. 3B, the first touch electrodes 210 and the second touch electrodes 220 are non-coplanar. In the touch sensing substrate 300 shown in FIG. 3A and FIG. 3B, the color filter layers 121*f* are located between the first conducting lines 211 of the first touch electrodes 210 and the second conducting lines 221 of the second touch electrodes 220. That is, the first touch electrodes 210 and the second touch electrodes 220 are separated by the color filter layers 121*f*, so that any first touch electrode 210 is not in contact with any second touch electrode 220.

In addition, the touch sensing substrate 300 also includes an insulation layer 340 and a plurality of bridging lines 430. Each of the bridging lines 430 connects two adjacent ones of the first touch electrodes 210, so as to electrically connect the two adjacent ones of the first touch electrodes 210 arranged along the first direction D1 to form the first touch sensing strips (not marked in FIG. 3A) arranged along a second direction D2. The bridging lines 430 and the first conducting lines 211 are coplanar, as shown in FIG. 3B. The insulation layer 340 covers the first conducting lines 211, the first connecting lines 212, and the bridging lines 430, to protect the first touch electrodes 210.

It is worth noting that in the touch sensing substrate 300 of FIG. 3A and FIG. 3B, the first conducting lines 211 and the second conducting lines 221 that are non-coplanar may all be replaced with that are coplanar, as shown in FIG. 1B. In addition, the bridging lines 430 may also be replaced with the bridging lines 230 in the foregoing embodiments. Besides, in the touch sensing substrates 100 and 100' shown in FIG. 1B and FIG. 2, the original first conducting lines 211, the original first connecting lines 212, the original second conducting lines 221, and the original second connecting lines 222 that are coplanar may all be replaced with that as shown in FIG. 3B. In addition, the original bridging lines 230 may also be replaced with the bridging lines 430 in FIG. 3A and FIG. 3B. Therefore, the touch sensing substrate 100, 100', and 300 shown in FIG. 1A, FIG. 1B, FIG. 2, FIG. 3A, and FIG. 3B are all used as examples for description instead of limiting the present invention.

Figure 4A:
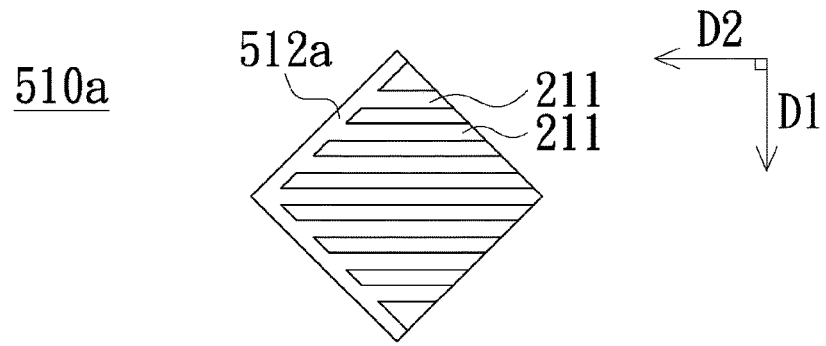
FIG. 4A to FIG. 4C are top views of a first touch electrode shown in three embodiments of the present invention.
Figure 4B:
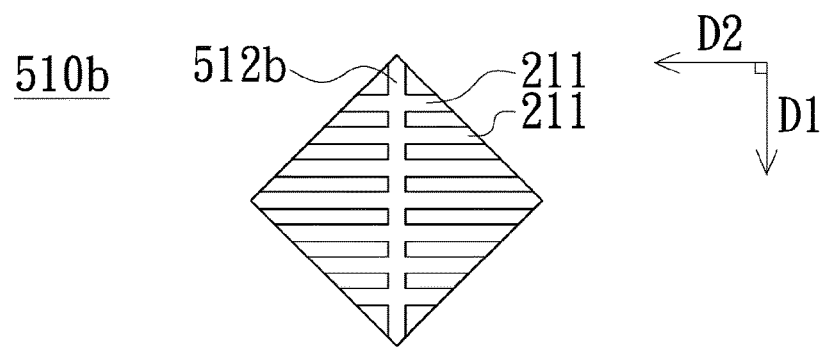
Figure 4C:
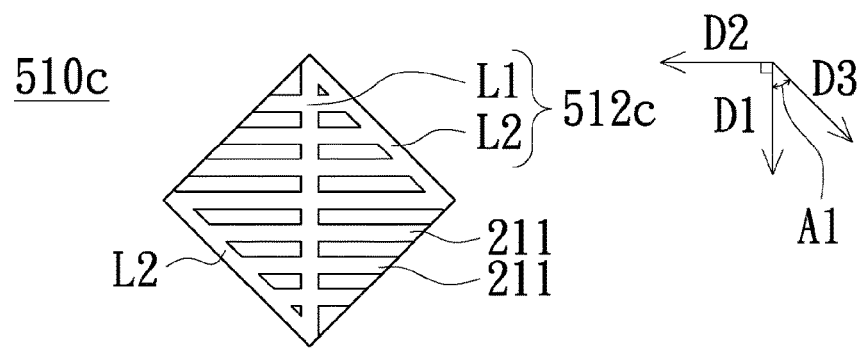

FIG. 4A to FIG. 4C are top views of a first touch electrode shown in three embodiments of the present invention. It should be noted that in several embodiments of the present invention (for example, the embodiment shown in FIG. 1A), shapes, outlines, and constructions of a first touch electrode (for example, the first touch electrode 210) and a second touch electrode (for example, the second touch electrode 220) may be the same to each other. Therefore, the shape, the outline, and the construction of the first touch electrode shown in FIG. 4A to FIG. 4C are the same as those of the second touch electrode, that is, the second touch electrode may also use the shape, the outline, and the construction shown in FIG. 4A to FIG. 4C.

First referring to FIG. 4A, in a first touch electrode 510*a* shown in FIG. 4A, a first connecting line 512*a* is formed on only one side of the first touch electrode 510*a*, for example, is formed on only the left side of the first touch electrode 510*a*, and a shape of the first connecting line 512*a* may substantially be in an inverted L shape, as shown FIG. 4A. In this way, an end point of each first conducting line 211 (a left-side end point as shown in FIG. 4A) is connected to the first connecting line 512*a*, but the other end point of each first conducting line 211 (a right-side end point as shown in FIG. 4A) is not connected to the first connecting line 512*a*.

First referring to FIG. 4B, in a first touch electrode 510*b* shown in FIG. 4B, a first connecting line 512*b* extends along the first direction D1. The first connecting line 512*b* is connected to the first conducting lines 211, but is not connected to end points of the first conducting lines 211. Using FIG. 4B as an example, an outline of the first touch electrode 510*b* is a diamond, the first connecting line 512*b* is located on a longitudinal diagonal line of the diamond, so that the first connecting line 512*b* is substantially connected to a center of each first conducting line 211 but is not connected to any end point of the first conducting lines 211.

First referring to FIG. 4C, in a first touch electrode 510*c* shown in FIG. 4C, the first connecting line 512*c* includes a plurality of line segments: a first line segment L1 and a plurality of second line segments L2. The first line segment L1 is substantially the same as the first connecting line 512*b* in FIG. 4B. That is, the first line segment L1 extends along the first direction D1, is connected to the first conducting lines 211, but is not connected to end points of the first conducting lines 211. The first line segment L1 is located between the second line segments L2. One of the second line segments L2 is connected to end points of some of the first conducting lines 211, and another one of the second line segments L2 is connected to end points of some others of the first conducting lines 211. The one of the second line segments L2 and another one of the second line segments L2 may be a pair of parallel lines.

The first line segment L1 is located between the second line segments L2, and two opposite end points of the first line segment L1 are respectively directly connected to end points of the second line segments L2, so as to form the first connecting line 512*c* in a Z shape or in an inverted Z shape as shown in FIG. 4C. The two second line segments L2 shown in FIG. 4C are respectively located on an upper right part and a lower left part of the first touch electrode 510*c*. Each second line segment L2 extends along a third direction D3, and in the embodiment of FIG. 4C, the third direction D3 is neither parallel to nor perpendicular to the first direction D1 and the second direction D2. An included angle A1 between the third direction D3 and the first direction D1 may be approximately greater than 0 degree and less than 90 degrees.

It is worth noting that the first connecting line 212 shown in FIG. 1A and the first connecting lines 512*a*, 512*b*, and 512*c* shown in FIG. 4A to FIG. 4C may be combined with each other or changed randomly. For example, the first connecting line 512*b* of FIG. 4B may be formed in the first touch electrode 210 or the second touch electrode 220 of FIG. 1A. Alternatively, a shape of the first connecting line 512a in FIG. 4A may be substantially an L shape, and is only formed on the left side of the first touch electrode 510a. In addition, it is emphasized again that the second touch electrode (for example, the second touch electrode 220) may also use the shapes and constructions of the first touch electrodes 510a, 510b, and 510c shown in FIG. 4A to FIG. 4C. Therefore, the first touch electrode 210, 510a, 510b, and 510c and the second touch electrode 220 shown in FIG. 1A and FIG. 4A to FIG. 4C are merely used as examples for description instead of limiting the present invention.

Figure 5:
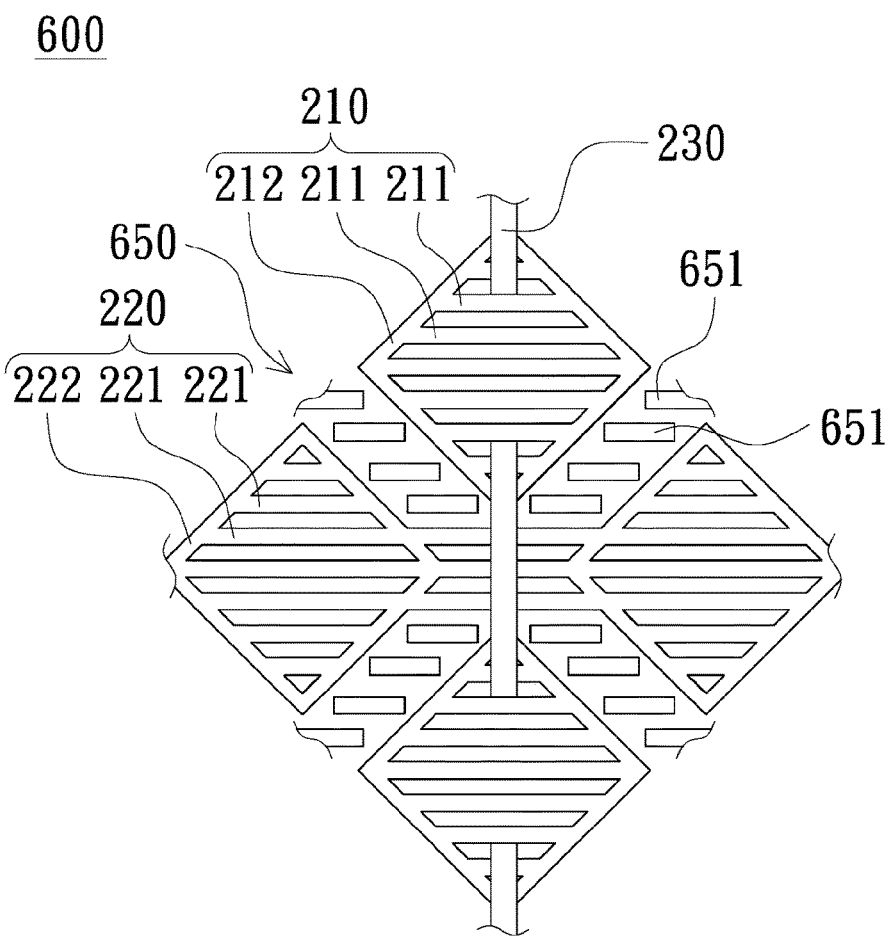
FIG. 5 is a top view of a structure integrating polarization and touch functions according to an embodiment of the present invention.

FIG. 5 is a top view of a structure integrating polarization and touch functions according to an embodiment of the present invention. Referring to FIG. 5, a structure 600 integrating polarization and touch functions is similar to the structure 200 integrating polarization and touch functions in the foregoing embodiments. Therefore, only differences between the structure 600 integrating polarization and touch functions and the structure 200 integrating polarization and touch functions are described below, and details of the same technical features are not described again.

In addition to including a plurality of first touch electrodes 210 and a plurality of second touch electrodes 220, the structure 600 integrating polarization and touch functions further includes a mesh wire grid 650. Specifically, the mesh wire grid 650 includes a plurality of third conducting lines 651 that are parallel to each other. Extending directions of the third conducting lines 651 are all the same as extending directions of the first conducting lines 211 and the second conducting lines 221. That is, the third conducting lines 651 are also arranged along the first direction D1 (not shown in FIG. 5), and materials, forming methods, and dimensions, such as thicknesses, widths, and pitches of the third conducting lines 651 may be all the same as those of the first conducting lines 211 and the second conducting lines 221. However, the mesh wire grid 650 is only formed on a mesh area (not marked) between the first touch electrodes 210 and the second touch electrodes 220, and may be not connected to the first touch electrodes 210 and the second touch electrodes 220. Therefore, any third conducting line 651 is merely formed inside the foregoing mesh area, and may be also not in contact with any first conducting line 211 or any second conducting line 221.

Figure 6:
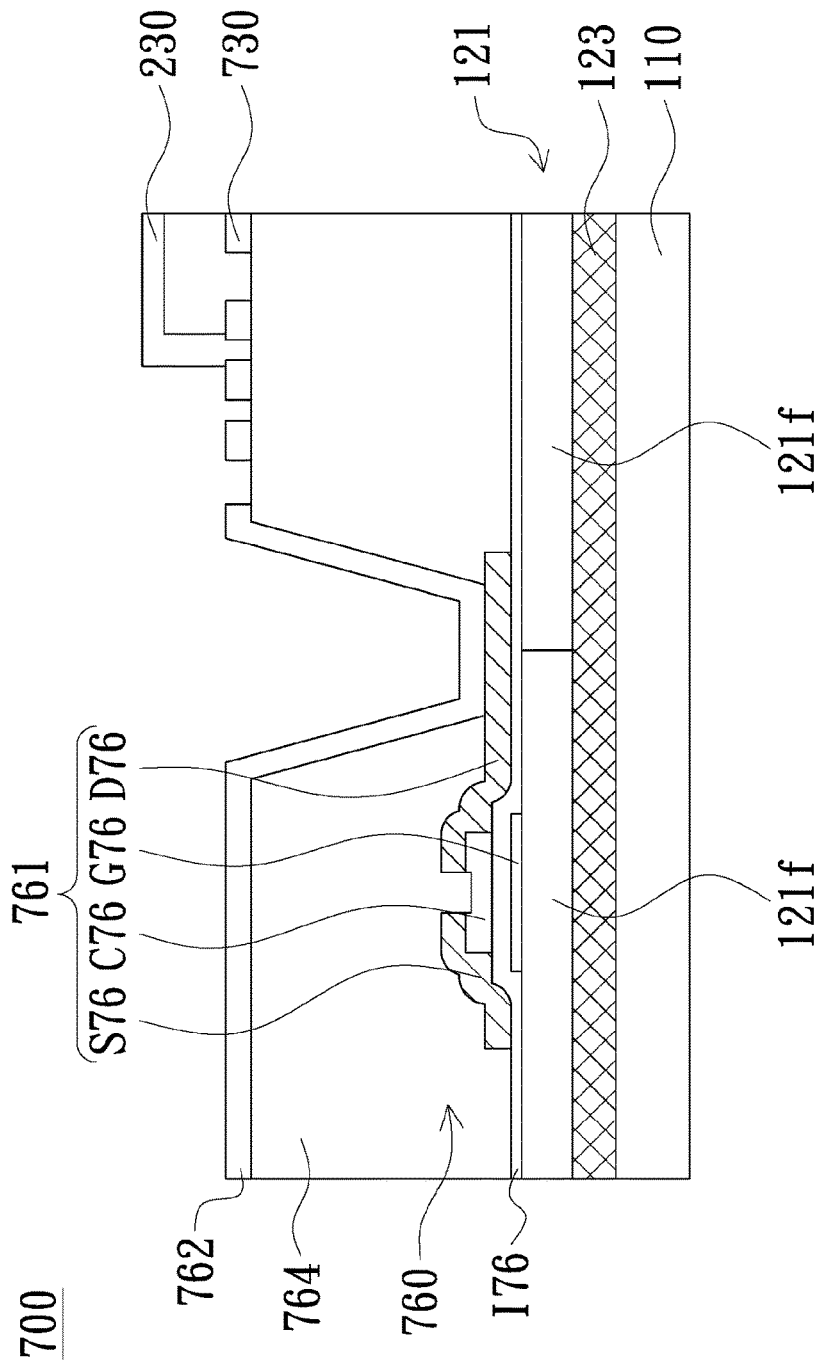
FIG. 6 is a sectional view of a touch sensing substrate according to another embodiment of the present invention.

FIG. 6 is a sectional view of a touch sensing substrate according to another embodiment of the present invention. Referring FIG. 6, different from the touch sensing substrates 100, 100', and 300 that may be used as color filter array substrates in the foregoing embodiments, a touch sensing substrate 700 of this embodiment includes an active component array 760, which can be used for controlling a gray level of a pixel in a display (for example, an LCD). Therefore, the touch sensing substrate 700 may be further used as an active component array substrate of a display.

The touch sensing substrate 700 also includes the color filter array 121 and the substrate 110. The color filter array 121 is located between the active component array 760 and the first surface 111 of the substrate 110, as shown in FIG. 6. The active component array 760 includes a plurality of thin-film transistors 761 (only one is drawn in FIG. 6 as an example for description), and each thin-film transistor 761 has a gate G76, a source S76, a drain D76, and a semiconductor layer C76. The touch sensing substrate 700 further includes a gate insulation layer I76 and an insulation layer 764. The gate insulation layer I76 covers the color filter array 121 and the gate G76 located on the color filter array 121, so as to separate the gate G76 and the semiconductor layer C76 from each other. The insulation layer 764 covers the active component array 760, the color filter array 121, and the substrate 110, to protect the active component array 760 and the color filter array 121.

The touch sensing substrate 700 may also include a plurality of pixel electrodes 762 (only one is drawn in FIG. 6 as an example for description), formed on the insulation layer 764 and being connected to the drain D76 by passing through the insulation layer 764. When the touch sensing substrate 700 is used for manufacturing an LCD, a liquid crystal layer including a plurality of liquid crystal molecules is formed above the insulation layer 764 and the pixel electrodes 762, and the thin-film transistors 761 of the active component array 760 can output pixel voltages to the pixel electrodes 762, to deviate the liquid crystal molecules above the pixel electrode 762, so as to control a gray level of the pixel.

In addition, it should be noted that the touch sensing substrate 700 also includes the structure 200 or 600 integrating polarization and touch functions as described in the foregoing embodiments. The touch sensing substrate 700 further includes a touch electrode layer 730 and a plurality bridging lines 230 connecting to the touch electrode layer 730. The touch electrode layer 730 and the bridging lines 230 are all formed on the insulation layer 764. Therefore, the active component array 760 is located between the first touch electrodes 810 and the substrate 110, and between the second touch electrodes 820 and the substrate 110. In addition, another insulation layer may be formed between the bridging lines 230 and the touch electrode layer 730. The touch electrode layer 730 includes a plurality of first touch electrodes 210 and a plurality of second touch electrodes 220 (not drawn in FIG. 6). Relative positions and connection relationships among the bridging line 230, the first touch electrode 210, and the second touch electrode 220 are all described in the foregoing embodiment, and therefore, details are not described herein again.

It should be noted that in the embodiment of FIG. 6, the touch sensing substrate 700 includes a color filter array 121, but in another embodiment, the color filter array 121 may be formed on another substrate, for example, be formed on a color filter array substrate opposite to the touch sensing substrate 700. Therefore, the touch sensing substrate 700 do not need to include the color filter layers 121f or the black matrix 123, or the whole color filter array 121. Therefore, the color filter layer 121 and the black matrix 123 shown in FIG. 6 are merely used as examples for description instead of limiting the present invention.

Figure 7:
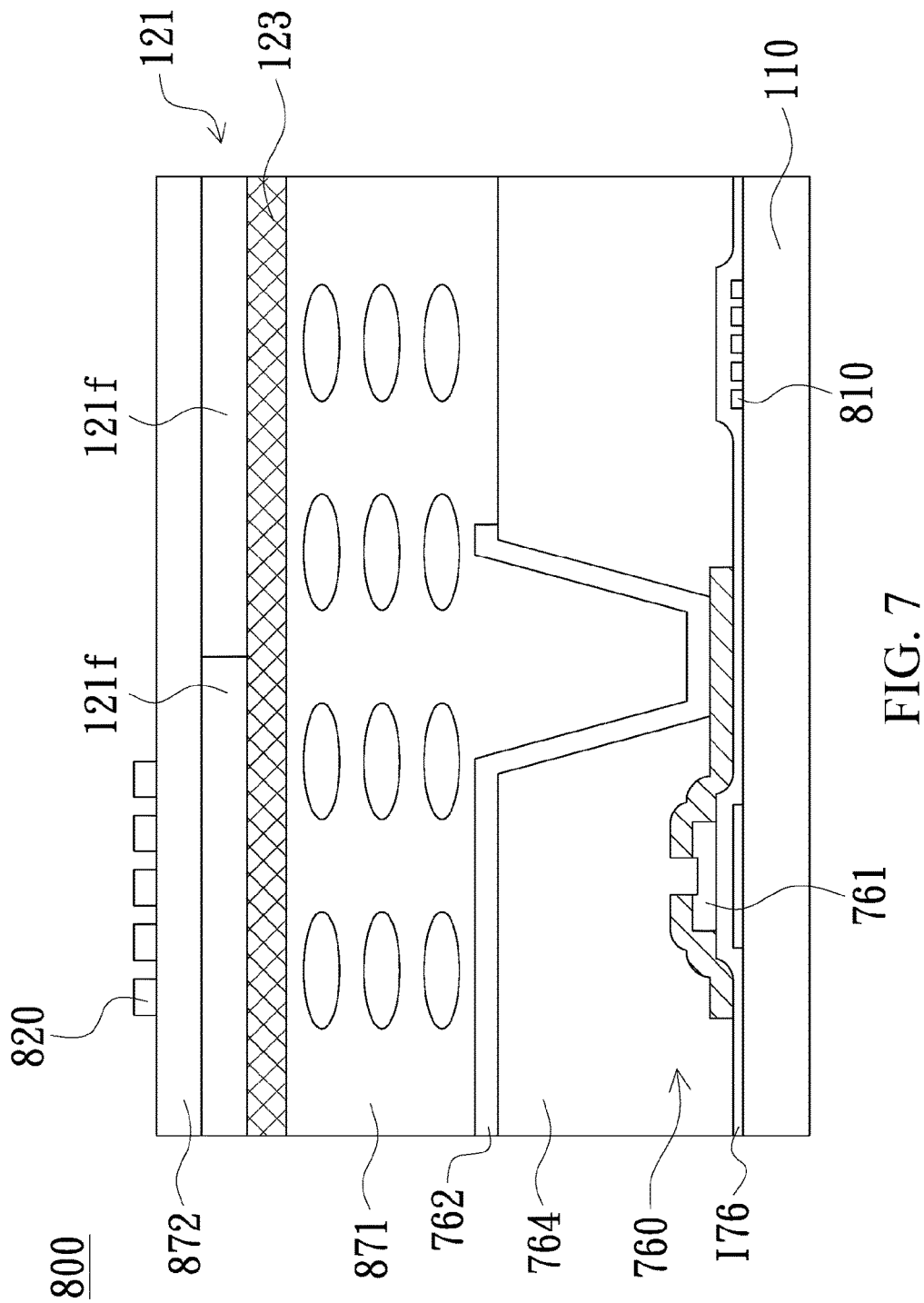
FIG. 7 is a sectional view of a touch sensing substrate according to another embodiment of the present invention.

FIG. 7 is a sectional view of a touch sensing substrate according to another embodiment of the present invention. Referring to FIG. 7, a touch sensing substrate 800 shown in FIG. 7 is similar to the foregoing touch sensing substrate 700 of FIG. 6. Both of the touch sensing substrate 800 and the touch sensing substrate 700 include the active component array 760 and have functions and advantages that are basically the same. Moreover, differences between the touch sensing substrates 800 and 700 are merely described below. Details of the same technical features are not described again.

The touch sensing substrate 800 includes a plurality of first touch electrodes 810 and a plurality of second touch electrodes 820. The first touch electrode 810 may be the same as or different from the second touch electrode 820, and the first touch electrode 810 and the second touch electrode 820 may be any one of the foregoing first touch electrodes 210, 510a, 510b, and 510c, and the second touch electrode 220. In addition, the touch sensing substrate 800 may be a liquid crystal display panel including a liquid crystal layer 871 and an opposite substrate 872. The liquid crystal layer 871 is formed between the opposite substrate 872 and the active component array 760.

Different from the foregoing embodiments, in the touch sensing substrate 800, the first touch electrodes 810 and the second touch electrodes 820 are respectively formed on substrates located on two sides of the liquid crystal layer 871. The first touch electrodes 810 are formed on the substrate 110 and are covered by the gate insulation layer 176, and the second touch electrodes 820 are formed on the opposite substrate 872. In addition, the active component array 760 and the color filter array 121 are also respectively formed on the substrates on the two sides of the liquid crystal layer 871. The color filter array 121 is formed on the opposite substrate 872, and the active component array 760 is formed on the substrate 110. Therefore, the active component array 760 is also located between the color filter array 121 and the first surface 111 of the substrate 110.

It could be learned from the above that in this embodiment, the first touch electrodes 810 are substantially manufactured in the active component array substrate, and the second touch electrodes 820 are substantially manufactured in the color filter array substrate. The liquid crystal layer 871 separates the first touch electrodes 810 from the second touch electrodes 820, to prevent the first touch electrodes 810 from being in contact with the second touch electrodes 820. Moreover, both of the active component array 760 and the color filter array 121 are located between the first touch electrodes 810 and the second touch electrodes 820, as shown in FIG. 7.

Based on the above, the first conducting lines and second conducting lines whose widths range from 50 to 100 nanometers, a plurality of first touch electrodes and a plurality of second touch electrodes are formed, so as to manufacture a structure integrating polarization and touch functions, which can directly constitutes at least one part of a display (for example, an LCD) such as a color filter array substrate, a polarizer, an active component array substrate, or an LCD panel of an LCD. In this way, the present invention is beneficial to manufacturing an in-cell touch screen having a smaller thickness.

In addition, the foregoing touch sensing substrate described in the present invention may directly constitute at least one part (such as a polarizer or an active component array substrate) of a display. Therefore, compared with a conventional touch screen formed by adhering a display panel and a touch sensing substrate, the touch sensing substrate of the present invention does not have defects such as misalignment or an air bubble. Therefore, a rework process for handling misalignment or an air bubble can be omitted, and meanwhile, a scrapping rate of the touch screen may be reduced, so as to improve a product yield.

Although preferred embodiments of the present invention are disclosed as above, they are not intended to limit the present invention. Any person of ordinary skill in the art may make some variations or modifications without departing from the spirit and scope of the present invention. Therefore, the protection scope of the present invention shall be subject to the protection scope of the appended claims.

What is claimed is:

1. A structure integrating polarization and touch functions, comprising:
   a plurality of first touch electrodes, wherein one of the first touch electrodes comprises:
   a plurality of first conducting lines, arranged along a first direction, wherein end points of the first conducting lines are substantially disposed along an outline of an M-sided polygon, and M is a positive integer greater than or equal to 3; and
   a first connecting line, electrically connecting the first conducting lines, comprising:
   a first line segment, extending along the first direction and being not connected to the end points of the first conducting lines; and
   a plurality of second line segments, wherein the first line segment is located between the second line segments, each of the second line segments extends along a third direction, the third direction is neither parallel to nor perpendicular to the first direction and the second direction, one of the second line segments is connected to end points of some of the first conducting lines, and another one of the second line segments is connected to end points of some others of the first conducting lines; and
   a plurality of second touch electrodes that are not in contact with the first touch electrodes, wherein one of the second touch electrodes comprises:
   a plurality of second conducting lines arranged along the first direction, wherein end points of the second conducting lines are substantially disposed along an outline of an N-sided polygon, and N is a positive integer greater than or equal to 3; and
   a second connecting line, electrically connecting the second conducting lines, wherein widths of each of the first conducting lines and each of the second conducting lines range from approximately 50 to 100 nanometers.

2. The structure according to claim 1, further comprising a plurality of bridging lines, wherein each of the bridging lines electrically connects two adjacent ones of the first touch electrodes arranged along the first direction to form a plurality of first touch sensing strips arranged along a second direction, and the second direction is different from the first direction, and wherein two adjacent ones of the second touch electrodes arranged along the second direction are electrically connected to each other to form a plurality of second touch sensing strips arranged along the first direction.

3. The structure according to claim 2, wherein the second direction is perpendicular to the first direction.

4. The structure according to claim 2, further comprising a plurality of joining lines, wherein each of the joining lines electrically connects two adjacent ones of the second touch electrodes arranged along the second direction to form the second touch sensing strips, and each of the joining lines electrically connects two adjacent ones of the second conducting lines.

5. The structure according to claim 1, wherein the first connecting line of the one of the first touch electrodes connects the end points of the first conducting lines of the one of the first touch electrodes to form the M-sided polygon.

6. The structure according to claim 1, wherein an end point of each of the first conducting lines of the one of the first touch electrodes is connected to the first connecting line of the one of the first touch electrodes, and the other end point of each of the first conducting lines of the one of the first touch electrodes is not connected to the first connecting line of the one of the first touch electrodes.

7. The structure according to claim 1, wherein the first connecting line of the one of the first touch electrodes extends along the first direction and is not connected to the end points of the first conducting lines of the one of the first touch electrodes.

8. The structure according to claim 1, wherein an included angle between the third direction and the first direction is approximately greater than 0 degree and less than 90 degrees.

9. The structure according to claim 8, wherein two end points of the first line segment are respectively directly connected to end point of one of the second line segments and end point of another one of the second line segments.

10. The structure according to claim 1, wherein a sum of a total number of the first conducting lines and a total number of the second conducting lines is a conducting line sum, and a sum of a total number of the first connecting lines and a total number of the second connecting lines is a connecting line sum, wherein a ratio of the connecting line sum to the conducting line sum is approximately greater than 0 and less than or equal to 0.5.

11. The structure according to claim 1, wherein the first touch electrodes and the second touch electrodes are coplanar.

12. The structure according to claim 1, wherein the first touch electrodes and the second touch electrodes are non-coplanar.

13. The structure according to claim 1, further comprising:
a mesh wire grid, formed on a mesh area between the first touch electrodes and the second touch electrodes, wherein the mesh wire grid comprises a plurality of third conducting lines that are parallel to each other, wherein the third conducting lines are arranged along the first direction, and are not connected to the first touch electrodes and the second touch electrodes, and a width of each of the third conducting lines is approximately 50 to 100 nanometers.

14. A touch sensing substrate, comprising:
a substrate, having a first surface;
a color filter array, comprising a plurality of color filter layers, disposed on the first surface;
a plurality of first touch electrodes, disposed on the first surface, wherein one of the first touch electrodes comprises:
a plurality of first conducting lines, arranged along a first direction, wherein end points of the first conducting lines are substantially disposed along an outline of an M-sided polygon, and M is a positive integer greater than or equal to 3; and
a first connecting line, electrically connecting the first conducting lines;
a plurality of second touch electrodes, disposed on the first surface, that are not in contact with the first touch electrodes, wherein one of the second touch electrodes comprises:
a plurality of second conducting lines, arranged along the first direction, wherein end points of the second conducting lines are substantially disposed along an outline of an N-sided polygon, and N is a positive integer greater than or equal to 3; and
a second connecting line, electrically connecting the second conducting lines, wherein widths of each of the first conducting lines and each of the second conducting lines range from approximately 50 to 100 nanometers; and
an active component array located between the color filter array and the first surface, located between the first touch electrodes and the substrate, and located between the second touch electrodes and the substrate.

15. The touch sensing substrate according to claim 14, wherein the color filter layers substantially cover the first touch electrodes and the second touch electrodes.

16. The touch sensing substrate according to claim 14, wherein the first touch electrodes and the second touch electrodes substantially cover the color filter layers.

17. The touch sensing substrate according to claim 14, further comprising a plurality of bridging lines, wherein each of the bridging lines electrically connects two adjacent ones of the first touch electrodes arranged along the first direction to form a plurality of first touch sensing strips arranged along a second direction, and the second direction is different from the first direction, and wherein two adjacent ones of the second touch electrodes arranged along the second direction are electrically connected to each other to form a plurality of second touch sensing strips arranged along the first direction.

18. The touch sensing substrate according to claim 17, wherein the color filter layers are located between the first touch electrodes and the bridging lines.

19. The touch sensing substrate according to claim 14, wherein the color filter array further comprises a black matrix, located between the color filter layers and the substrate.

20. A touch sensing substrate, comprising:
a substrate, having a first surface;
a color filter array, comprising a plurality of color filter layers, disposed on the first surface; and
a plurality of first touch electrodes, disposed on the first surface, wherein one of the first touch electrodes comprises:
a plurality of first conducting lines, arranged along a first direction, wherein end points of the first conducting lines are substantially disposed along an outline of an M-sided polygon, and M is a positive integer greater than or equal to 3; and
a first connecting line, electrically connecting the first conducting lines; and
a plurality of second touch electrodes, disposed on the first surface, that are not in contact with the first touch electrodes, wherein one of the second touch electrodes comprises:
a plurality of second conducting lines, arranged along the first direction, wherein end points of the second conducting lines are substantially disposed along an outline of an N-sided polygon, and N is a positive integer greater than or equal to 3; and
a second connecting line, electrically connecting the second conducting lines, wherein widths of each of the first conducting lines and each of the second conducting lines range from approximately 50 to 100 nanometers; and
a plurality of bridging lines, wherein each of the bridging lines electrically connects two adjacent ones of the first touch electrodes arranged along the first direction to form a plurality of first touch sensing strips arranged along a second direction, and the second direction is different from the first direction, and wherein two adjacent ones of the second touch electrodes arranged along the second direction are electrically connected to each other to form a plurality of second touch sensing strips arranged along the first direction;
wherein the bridging lines, the first touch electrodes, and the second touch electrodes are located between the color filter layers and the first surface.

21. A touch sensing substrate, comprising:
a substrate, having a first surface;

a color filter array, comprising a plurality of color filter layers, disposed on the first surface:

a plurality of first touch electrodes, disposed on the first surface, wherein one of the first touch electrodes comprises:

a plurality of first conducting lines, arranged along a first direction, wherein end points of the first conducting lines are substantially disposed along an outline of an M-sided polygon, and M is a positive integer greater than or equal to 3;and a first connecting line, electrically connecting the first conducting lines; and a plurality of second touch electrodes, disposed on the first surface, that are not in contact with the first touch electrodes, wherein one of the second touch electrodes comprises:

a plurality of second conducting lines, arranged along the first direction, wherein end points of the second conducting lines are substantially disposed along an outline of an N-sided polygon, and N is a positive integer greater than or equal to 3; and a second connecting line, electrically connecting the second conducting lines, wherein widths of each of the first conducting lines and each of the second conducting lines range from approximately 50 to 100 nanometers; and an active component array, wherein the active component array and the color filter array are both located between the first touch electrodes and the second touch electrodes.

22. A structure integrating polarization and touch function, comprising:

a plurality of first touch electrodes, wherein one of the first touch electrodes comprises:

a plurality of first conducting lines, arranged along a first direction, wherein end points of the first conducting lines are substantially disposed along an outline of an M-sided polygon, and M is a positive integer greater than or equal to 3;and a first connecting line, electrically connecting the first conducting lines; and a plurality of second touch electrodes that are not in contact with the first touch electrodes, wherein one of the second touch electrodes comprises:

a plurality of second conducting lines, arranged along the first direction, wherein end points of the second conducting lines are substantially disposed along an outline of an N-sided polygon, and N is a positive integer greater than or equal to 3; and a second connecting line, electrically connecting the second conducting lines, wherein widths of each of the first conducting lines and each of the second conducting lines range from approximately 50 to 100 nanometers, a pitch between two adjacent ones of the first conducting lines ranges from approximately 50 to 100 nanometers, a pitch between two adjacent ones of the second conducting lines ranges from approximately 50 to 100 nanometers, and a thickness of one of the first conducting lines ranges from approximately 50 to 750 nanometers, and a thickness of one of the second conducting lines ranges from approximately 50 to 750 nanometers, so as to have a linear polarization function.

* * * * *